United States Patent [19]

Kadosawa et al.

[11] Patent Number: 5,418,919
[45] Date of Patent: May 23, 1995

[54] APPARATUS AND METHOD FOR CONCURRENTLY EXECUTING PLURAL TASKS IN WHICH IDENTIFIERS SPECIFY STEPS IN TASKS

[75] Inventors: Tsuneaki Kadosawa, Kanagawa; Takashi Nakamura, Hiratsuka; Eiji Koga, Hadano; Satoshi Ogiwara, Sagamihara; Tomoaki Kawai, Yokohama; Kunitaka Ozawa, Isehara, all of Japan

[73] Assignee: Canon Kabushiki Kaisha, Tokyo, Japan

[21] Appl. No.: 161,442

[22] Filed: Dec. 6, 1993

Related U.S. Application Data

[63] Continuation of Ser. No. 459,266, Dec. 29, 1989, abandoned.

[30] Foreign Application Priority Data

Jan. 10, 1989 [JP] Japan .................................... 1-2139
Jan. 23, 1989 [JP] Japan .................................... 1-11849

[51] Int. Cl.$^6$ ............................. G06F 9/40; G06F 9/46
[52] U.S. Cl. ............................. 395/375; 364/DIG. 1; 364/DIG. 2; 364/228; 364/228.1; 364/228.7; 364/229; 364/230; 364/230.3; 364/262.4; 364/263; 364/931; 364/931.4; 364/931.41; 364/931.46; 364/931.48; 364/946.2; 364/946.9

[58] Field of Search ............... 364/DIG. 1 MS File, 364/DIG. 2 MS File; 395/650, 700, 800, 375

[56] References Cited

U.S. PATENT DOCUMENTS

4,829,422  5/1989  Morton et al. ..................... 395/650

OTHER PUBLICATIONS

Rodnay Zaks, "Programming the Z80", Third Revised Edition by Sybex, Inc. Library of Congress Card Number: 81-51131, ISBN 0-89588-069-5 (1982) pp. 85 and 282.

Primary Examiner—Robert B. Harrell
Attorney, Agent, or Firm—Fitzpatrick, Cella, Harper & Scinto

[57] ABSTRACT

An information processing device which operates under a multiprogramming system stores instruction words and an execution condition word for each of those instruction words as a pair in program memories, judges whether or not an instruction can be executed on the basis of its execution condition word and executes the instruction when it is judged to be executable. An information processing device which operates under a multi-CPU system connects a plurality of memories to a plurality of CPUs. The plurality of memories store the global variables accessed most frequently by the CPU with which their own memories are connected.

8 Claims, 8 Drawing Sheets

APPARATUS AND METHOD FOR CONCURRENTLY EXECUTING PLURAL TASKS IN WHICH IDENTIFIERS SPECIFY STEPS IN TASKS

This application is a continuation of U.S. application Ser. No. 07/459,266 filed Dec. 29, 1989, which is now abandoned.

BACKGROUND OF THE INVENTION

The present invention relates to an information processing device and the manufacturing method of the same, and particularly to an information processing device and the manufacturing method of the same suited to operate in a multi-programing or multi-CPU system.

In a multi-programming system, simultaneous access to shared resources (programs, data and input/output ports) between tasks may be limited. Therefore, when a specific processing (step) in a task is to be executed, whether or not this processing (task) is in competition with other tasks at that time is determined, and this fact is often used as an execution condition for the above-mentioned specific processing.

For example, suppose that task 1 and task 2 are running on a computer which performs a plurality of tasks in pseudo-parallel. Suppose that this computer has an input/output port to be exclusively accessed, and let a variable to be output to the port be X and a variable for storing the value read out from the port be Y.

In the prior art, when task 1 outputs a variable X and task 2 inputs a variable Y in such a configuration, the following program had to be made so that task 1 and task 2 did not access the input/output port P at the same time.

[Task 1]
1: if Sp=0 then Sp=1 else goto 1
2: Output variable X to the input/output port P
3: Sp=0
4: Next processing

[Task 2]
1: if Sp=0 then Sp=1 else goto 1
2: Input the value of the input/output port P to variable Y
3: Sp=0
4: Next processing In the above, task 1 and task 2 are executed in pseudo-parallel. However, when each of the steps 1 to 4 is taken note of, they are executed consecutively. Sp is an auxiliary variable called a "semaphore" and the task which makes the "semaphore" "1" earliest can preferentially access the input/output port P. Therefore, if task 1 started slightly earlier than task 2, the access of the port P by task 1 is permitted, with the result that the access of the port P by the task 2 is delayed. In a system where the execution conditions for a certain processing are written as described above, the amount of coding increases and the incidence of bugs is high. Also, it is undesirable from the viewpoints of efficient use of memory and execution speed.

An example of a device that utilizes a conventional multi-CPU system is a lithography device for manufacturing semiconductors. The lithography device has various main controls, such as those for wafer handling, mask handling, and alignment lithography, the three main controls being shared by three respective CPUs. In the past, however, the processing of each main control was prescribed by one CPU and each corresponding program was written (compiled) for one CPU. For this reason, an effective matching of operations between multi-CPUs could not be achieved, lowering the overall control efficiency of the multi-CPUs at an actual operating time.

SUMMARY OF THE INVENTION

The present invention removes the above-described drawbacks of the prior art. An object of the present invention is to provide an information processing device for which the user can write execution conditions compactly and whose CPU can judge the execution conditions at high speed.

Another object of the present invention is to propose an information processing device which has high control efficiency of all of the entire multi-CPUs and to propose a manufacturing method of the same.

In order to attain the above-described objects, in an information processing device which operates in a multiprogramming system, an information processing device of the present invention comprises a program memory for storing with each instruction word an execution condition word thereof as a pair, execution condition discrimination means for judging whether or not an instruction by said instruction word can be executed on the basis of said execution condition word, and instruction execution means for executing said instruction when said discrimination means judges it executable.

In a preferred embodiment, the execution condition word consists of a word which specifies a task and a word that specifies the instruction word at a specific position in the task.

In a preferred embodiment, the execution condition discrimination means judges that when the instruction specified by the execution condition word is not being executed it can be executed.

In order to attain the above-described objects, in an information processing device which operates in a multi-CPU system, an information processing device of the present invention comprises a plurality of CPUs sharing various processes, and a plurality of memories each of which is connected to a specific one of said plurality of CPUs for storing variables that the plurality of CPUs have a common access to each of said variables being stored in a memory connected to the CPU which most frequently accesses the variable.

In order to attain the above-described objects, a manufacturing method of the information processing device of the present invention comprises the steps of compiling en block the processes that a multi-CPU system performs, counting the number of accesses by a CPU each time said CPU accesses operands of variables which said CPUs have common access to, and allocating the variable corresponding to a memory connected to the CPU which most frequently accesses the variable.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The embodiments of the present invention will be explained in detail hereinunder with reference to the accompanying drawings.

[FIRST EMBODIMENT]

The first embodiment relates to an information processing device which is suited to operate under a multi-progamming system.

Figure 1:
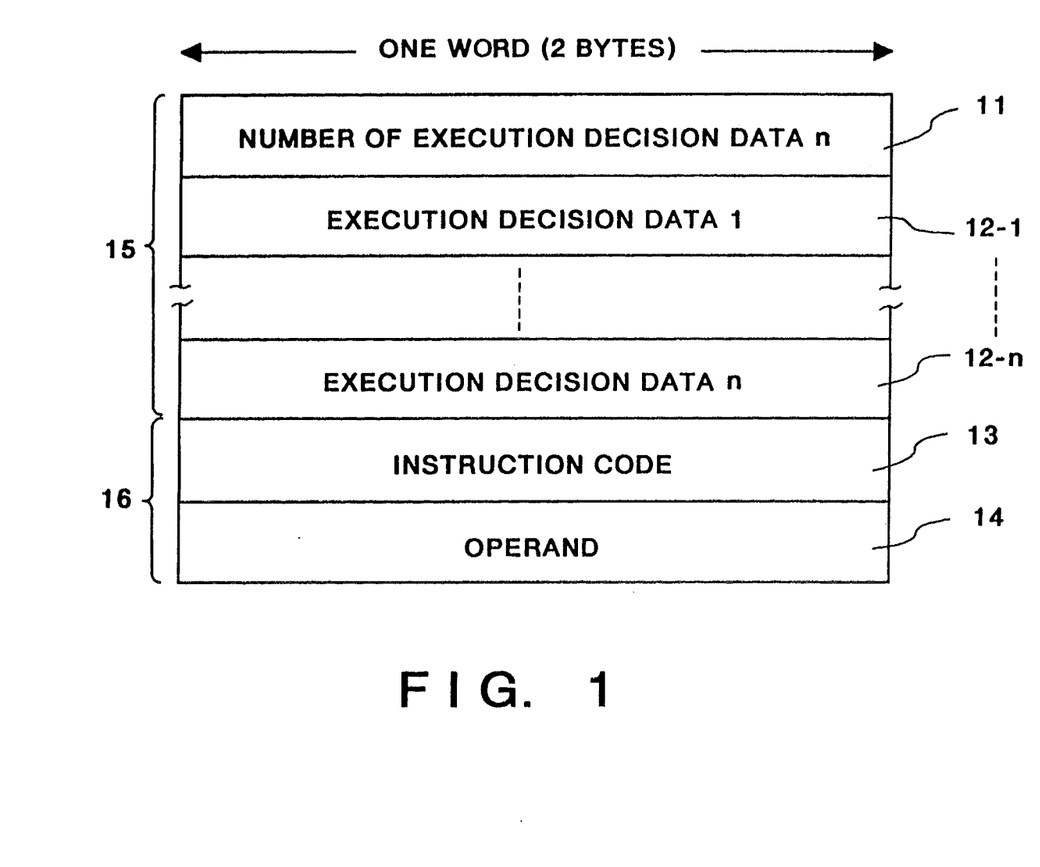
FIG. 1 is a view illustrating the instruction format of a computer of the first embodiment.

FIG. 1 is a view illustrating the instruction format of a computer of the first embodiment. In FIG. 1, the formats of an instruction code 13 and an operand 14 are the same as for a conventional computer. This embodiment, however, is characterized in that there are provided a number of execution decision data n 11 and execution decision data 12-1 to 12-n. The number of execution decision data n 11 indicates that there are n execution conditions as execution decision data 12-1 to 12-n following the number of execution decision data n 11 and, when n=0, the next instruction is unconditionally executed. Each execution decision data consists of a total one word of "task number X" and "step number N" in the task X. For example, when the upper-order byte X of the execution decision data is 2 and the lower-order byte N is 3, this means that if the third step of task number 2 is in execution, the next instruction code is not executed.

In this embodiment, a field consisting of the number of execution decision data n 11 and execution decision data 12-1 to 12-n may be called an execution condition decision section 15 and a field consisting of an instruction code 13 and an operand 14 may be called an instruction main body section 16. One instruction consists of an execution condition decision section 15 and an instruction main body section 16. In FIG. 1, one word (two bytes) of the operand 14 is shown, but actually the length of the operand 14 varies depending on the kind of the instruction code 13.

Figure 2:
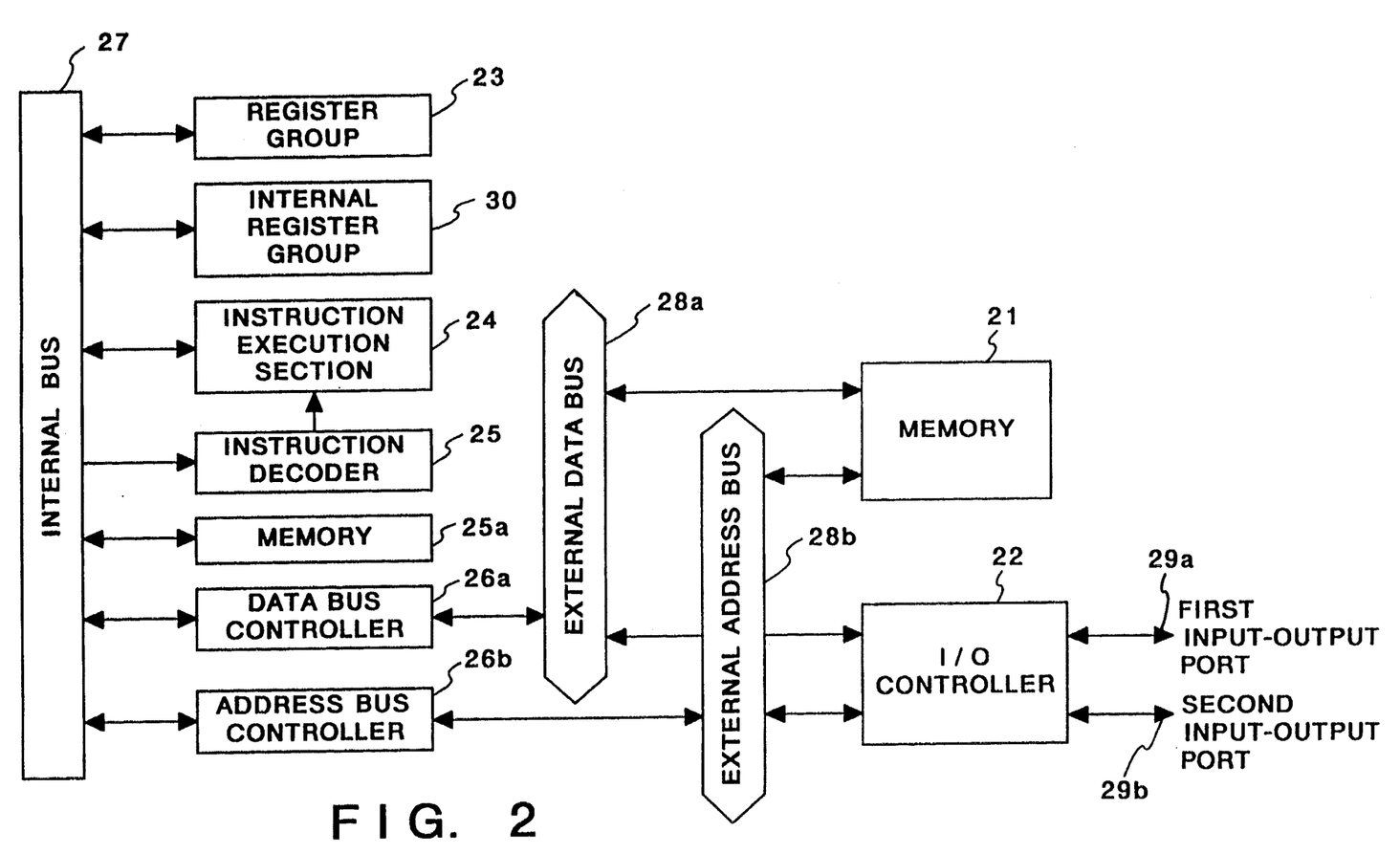
FIG. 2 is a block diagram of the configuration of the computer of the first embodiment.

FIG. 2 is a block diagram of a computer of the first embodiment. In the figure, a register group 23 capable of being referenced from user programs, an internal register group 30 unable to be referenced from user programs, a memory 25a storing instruction interpretation processing procedures of FIG. 3(a) and (b), an instruction decoder 25 that interprets instructions of the memory 25a, and an instruction execution section 24 that actually performs various calculations and data transfer according to the output of the instruction decoder 25 are connected via an internal bus 27. An internal register group 30 is further divided into the internal registers R0 to R7 (not shown) and can store a plurality of data. The internal register group 30 is used by the instruction decoder 25 in a process of interpreting instructions, so it cannot be referenced. The user programs and data are stored in memory 21.

Inputting/outputting of data with the outside is made via a first input/output port 29a and a second input/output port 29b connected to an I/O controller 22. The memory 21 and the I/O controller 22 send and receive data to and from the register group 23 and the instruction execution section 24 via the external data bus 28a and the external address bus 28b. At that time, sending and receiving of data with the internal bus 27 is controlled by a data bus controller 26a for the external data bus 28a and controlled by an address bus controller 26b for the external address bus 28b.

The instruction decoder 25 retrieves fields of a user program at units of one word from the memory 21 pointed by a program counter (not shown) into the internal register group 30, interprets it and sends the result of the interpretation to the instruction execution section 24. The instruction execution section 24 actually executes the instruction on the basis of the result of interpretation from the instruction decoder 25.

The computer of the first embodiment performs a plurality of different tasks in pseudo-parallel under the management of a multi-task operating system. A storage area for "task execution status data" is allocated in the memory 21 for each task. The "task execution status data" is data for indicating what step and in what state a certain task is executing. When a specific step of a certain task is executed, by referencing "task execution status data" recorded for a specific step of another task, it can be judged whether the other specific step is executing the current execution condition decision section 15 or the instruction main body section 16 or the step is not in execution.

Figure 3A:
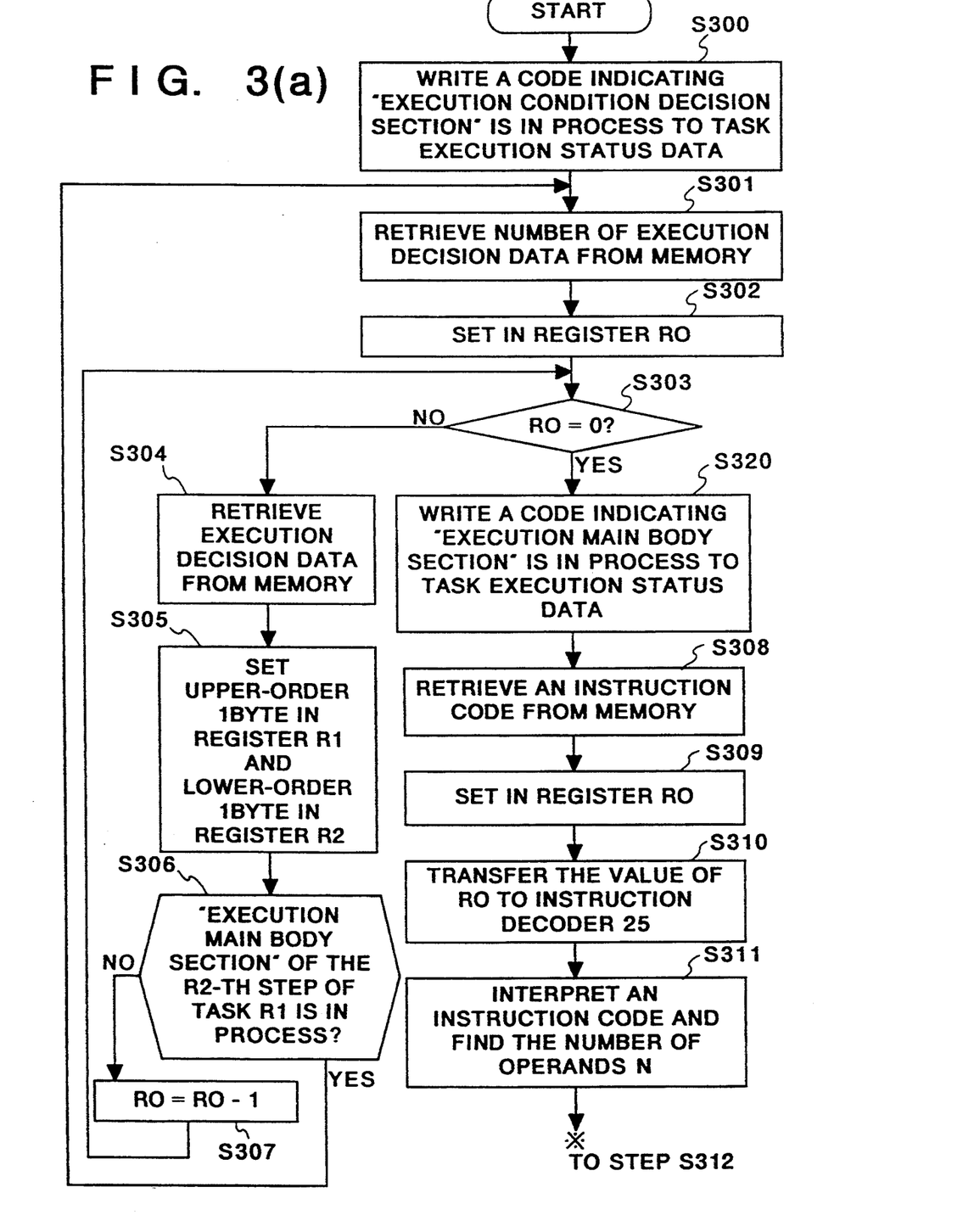
FIGS. 3(a) and 3(b) are flowcharts illustrating the procedures by which an instruction decoder 25 and an instruction execution section 24 interpret and execute instructions.
Figure 3B:
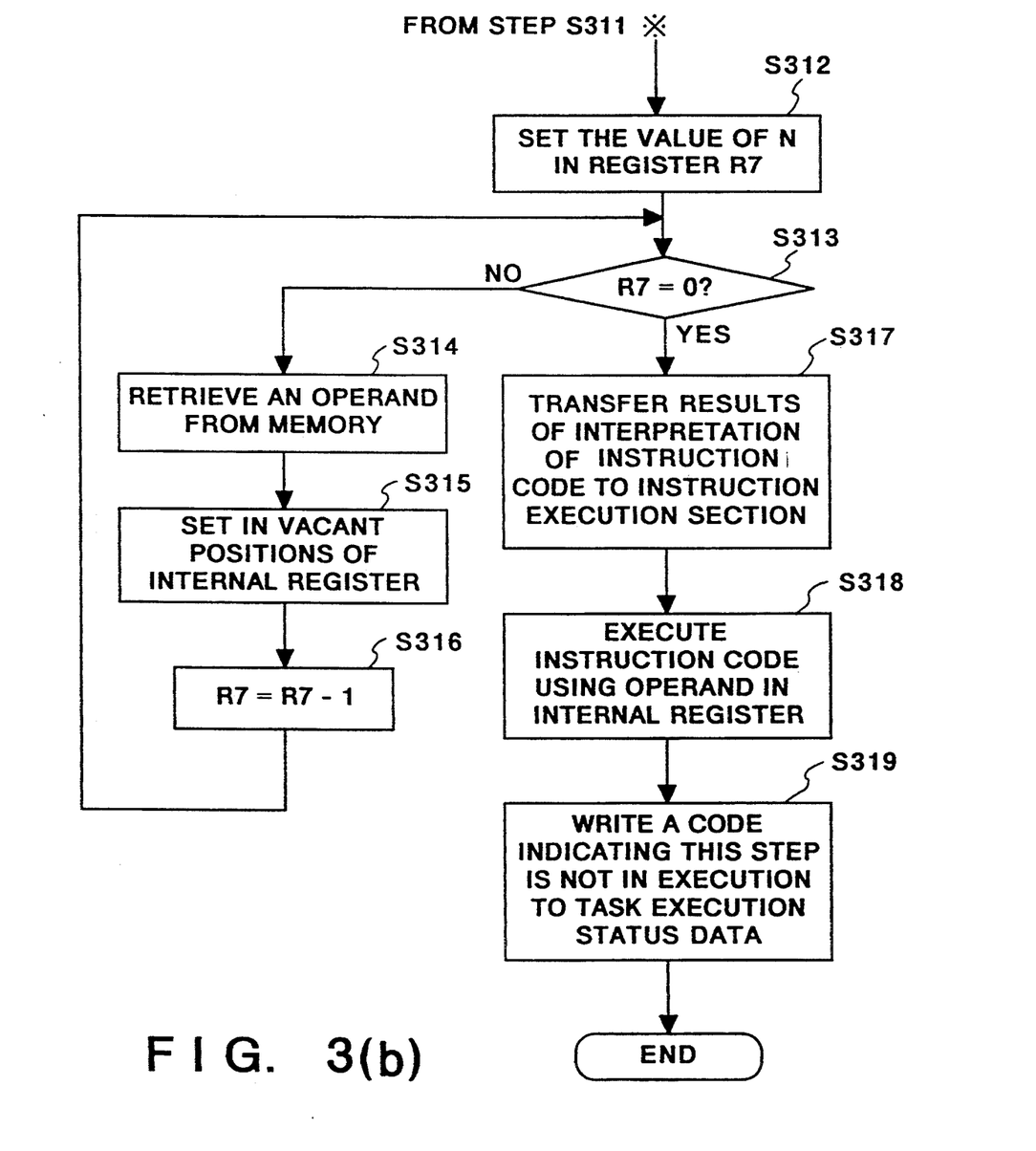

FIGS. 3(a) and (b) are flowcharts for illustrating the procedures that the instruction decoder 25 and the instruction execution section 24 interpret and execute an instruction.

Incidentally, FIGS. 3(a) and (b) show operations when a step in a task is taken note of. Under the management of a multi-task operating system, the processings of FIG. 3(a) and (b) are performed in pseudo-parallel with respect to each of a plurality of running tasks and creation of its "task execution status data" and judgment of another "task execution status data" are carried out for each task.

The field of each instruction format which is first processed is the execution condition decision section 15(the number of execution decision data n 11 and execution decision data 12-1 to 12-n). For this reason, in step S300, a code indicating that the execution condition decision section 15 is in process is written to the "task execution status data" of a task in execution. In step S301, the number of execution decision data n is retrieved from the memory 21, and in step S302 the retrieved value is set in an internal register R0. In step S303, it is judged whether or not the value of R0 is "0". If "0", the execution condition decision section 15 judges that the number of data is zero and the process proceeds to step S320. If not "0", the process proceeds to step S304 in order to check the execution decision data for the execution condition decision section 15.

In step S304, execution decision data is retrieved from the next field of the memory 21, and in step S305 the upper one byte of the data is set in an internal register R1 and the lower one byte is set in an internal register R2. In step S306, it is judged whether or not the instruction main body section 16 of the R2-th step of a task number R1 is in execution. In the case of "in execution", the execution of the instruction currently in process is held and the control returns to step S301. In the case of "not in execution", the control proceeds to step S307 where the value of the internal register R0 is decremented and returns to step S303. Since the number of execution decision data n is set in the internal register R0 in step S301, the loop from step S304 to step S307 is repeated n times at most and n number of execution decision data can be checked.

When it is judged in step S303 that R0 is "0", execution decision data to be retrieved no longer exists, so fetching of the instruction main body section 16 is started. Prior to this, in step S320 a code indicating that the instruction main body section 16 is being processed is written to task execution status data. In step S308, instruction codes are retrieved from the memory 21. In step S309, the retrieved instruction codes are set in the internal register R0, and in step S310 the instruction code of the internal register R0 is transferred to the decoder 25. In step S311, the instruction decoder 25 interprets an instruction code and finds the number of operands required N. In step S312, the value of the number of operands N found is set in the internal register R7. In step S313, it is judged whether or not R=0. If not "0", the operation proceeds to step S314 where an operand of one word at the position following an instruction code 13 is retrieved from the memory 21. In step S315, the retrieved operand is set in the internal register which is vacant, and in step S316, the value of the internal register R7 is decremented and the operation returns to step S313. In this way, the loop from step S314 to step S316 is repeated the same number of times as the number of operands with the internal register R7 as a loop counter.

When R7 is judged to be "0" in step S313, the operation proceeds to step S317 where the instruction decoder interprets the instruction code 13 and transfers the result of the interpretation to the instruction execution section 24. In step S318, the instruction received by the instruction execution section 24 is actually executed. As for an operand 14, the operand set in an internal register group 30 which was vacant in step S315 is used. The completion of the execution of step S318 completes one cycle of judgment of execution conditions, and interpretation and execution of an instruction. In step S319, a code indicating that this step is not in process is written to its "task execution status data" and the operation is terminated.

An example in which exclusive processing is performed by a computer of the first embodiment will be explained hereinunder.

Figure 4A:
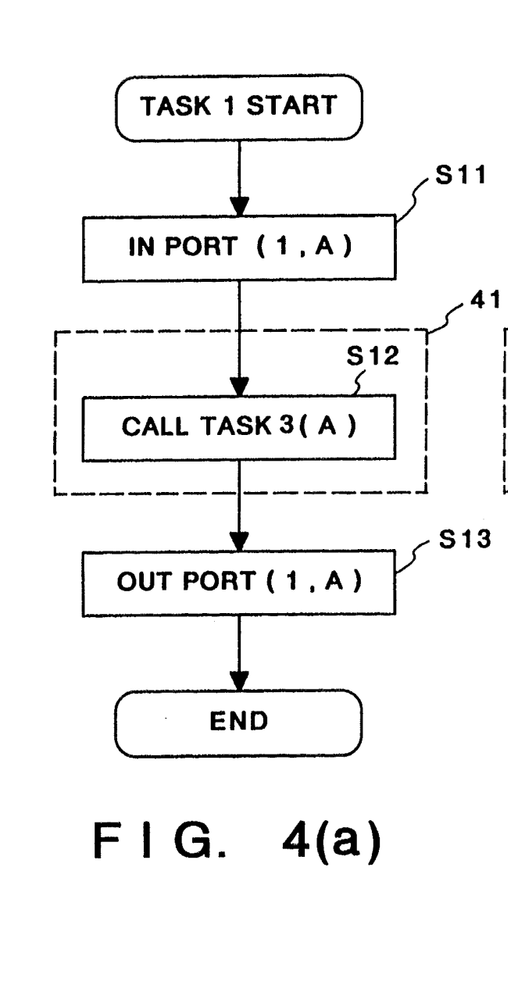
FIGS. 4(a) 4(b) and 4(c) are flowcharts of a parallel processing program of one embodiment.
Figure 4B:
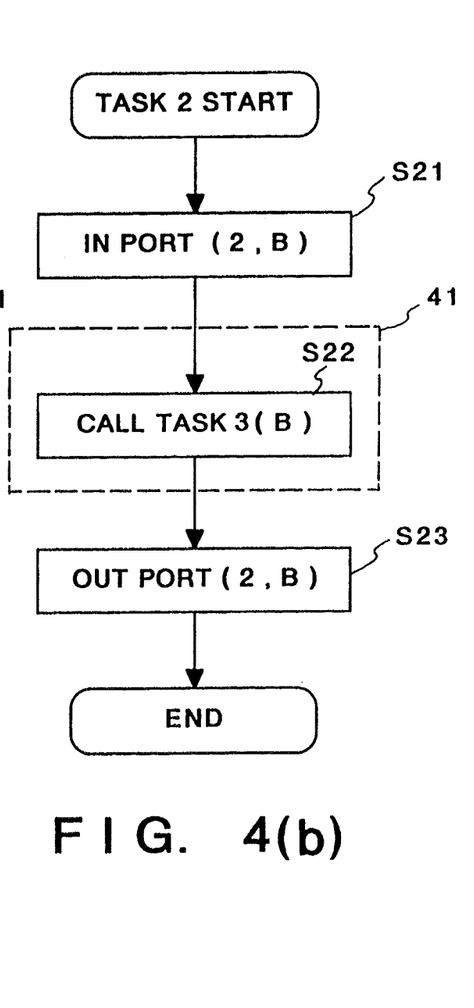
Figure 4C:
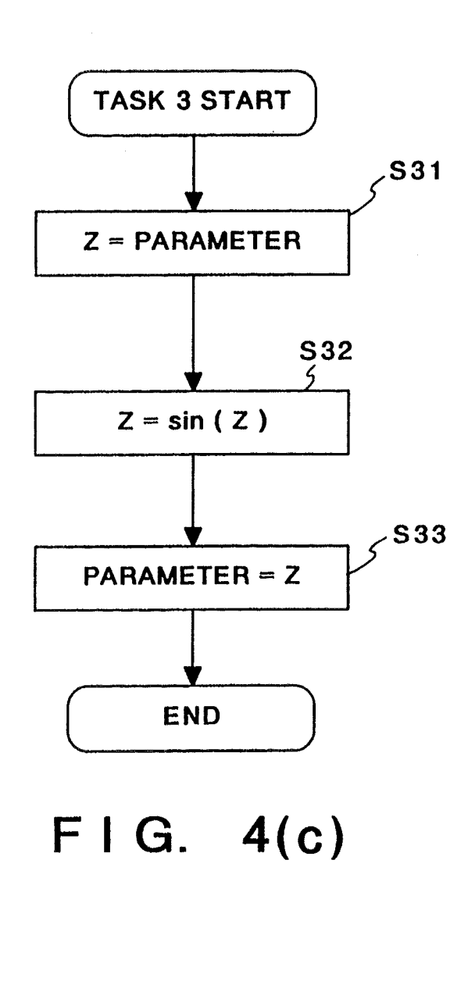

FIGS. 4(a) to (c) are flowcharts for one example of parallel processing programs. The portions surrounded by a dotted line 41 in these figures indicate that they must not be executed at the same time.

The meanings of instructions used in the programs of FIGS. 4(a) to (c) are listed in table 1.

TABLE 1

| in_port (port_i, var_i) | Reads data from an input/output port indicated by port_i and stores it in variable var i |
|---|---|
| out_Port (port_o, var_o) | Outputs the value of variable var_o to an input/output port indicated by port o |

TABLE 1-continued

| call task_n (para) | Calls a task indicated by task_n and gives para as a parameter |
|---|---|
| sin (para) | Calculates sin (sine of a parameter indicated by para) |
| left side = right side | Substitutes the value of left side with that of right side |

Each task will now be explained.

FIG. 4(a) is a flowchart of task 1. In this figure, in step S11 data is read in from the first input/output port 29a and its value is stored in a variable A in the memory 21. In step S12, task 3 is called by using the variable A as a parameter. In step S13, the value of the variable A is output to the first input/output port 29a.

FIG. 4(b) is a flowchart of task 2. In this figure, data is read in from the second input/output port 29b in step S21 and its value is stored in a variable. B in the memory 21. In step S22, task 3 is called by using the variable B as a parameter. In step S23, the value of the variable B is output to the second input/output port 29b.

FIG. 4(c) is a flowchart of task 3. In this figure, in step S31 the value of a received parameter is stored in a variable Z of the memory 21. In step S32, sin (Z) of the value of the variable Z is calculated and the result is input to the variable Z. In step S33, the value of the variable Z is input to an input/output parameter and the operation returns.

As explained above, task 1 and task 2 both call task 3. In this case, however, task 3 is not structured to be a re-entrant task. Therefore, the portions surrounded by a dotted line 41 in FIGS. 4(a) and (b) are required to be exclusively processed from the viewpoint of resources protection.

Figure 5A:
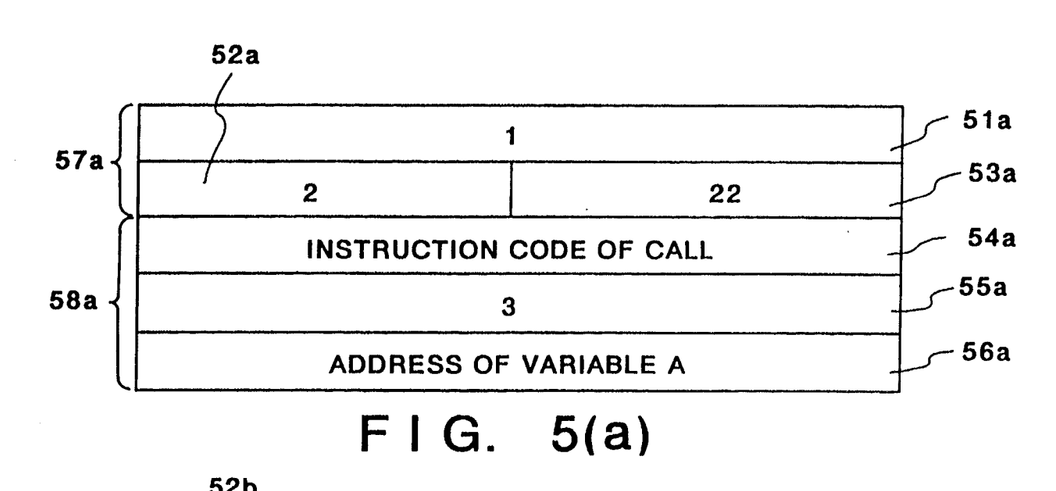
FIGS. 5(a) and 5(b) are views illustrating by what instruction the portion surrounded by a dotted line 41 of FIGS. 4(a) and 4(b) is stored in memory 21.

FIGS. 5(a) and (b) are views for respectively illustrating the form of instruction in which the portions surrounded by the dotted line 41 in FIGS. 4(a) and (b) are stored in the memory 21. Namely, FIG. 5(a) corresponds to step S12 of task 1 in FIG. 4(a), and FIG. 5(b) corresponds to step S22 of task 2 in FIG. 4(b). Reference numerals 57a, 57b designate execution condition decision sections; 58a, 58b, instruction main body sections; 51a, 51b, the numbers of execution decision data; (52a, 53a) and (52b, 53b), execution condition decision data. Respective task numbers are written to the upper-order bytes 52a, 52b of the execution decision data and step numbers in respective tasks are written to the lower-order bytes 53a, 53b thereof.

It is assumed in this embodiment that task 2 starts to run slightly later than task 1 and, after processing of the instruction main body section of step S12 of task 1 is started, processing of the execution condition decision section in step S22 of task 2 begins.

The procedures for executing instructions in FIG. 5 (a) will now be explained following the procedures of processing of FIGS. 3(a) and (b).

First, a code indicating that decision of the execution condition decision section 57a in step 12 of task 1 is in process is written to "task execution condition data". Data of a field 51a is retrieved and its value of "1" is set in the internal register R0.

Since the value of the internal register R0 is "1", the decision of step S303 of FIG. 3(a) branches to the side of NO. Then, the next one word (52a and 53a) is retrieved from the memory 21 and the value of the upper-order one byte "2" is set in an internal register R1 and the value of the lower-order one byte "22" is set in an internal register R2.

Figure 5B:
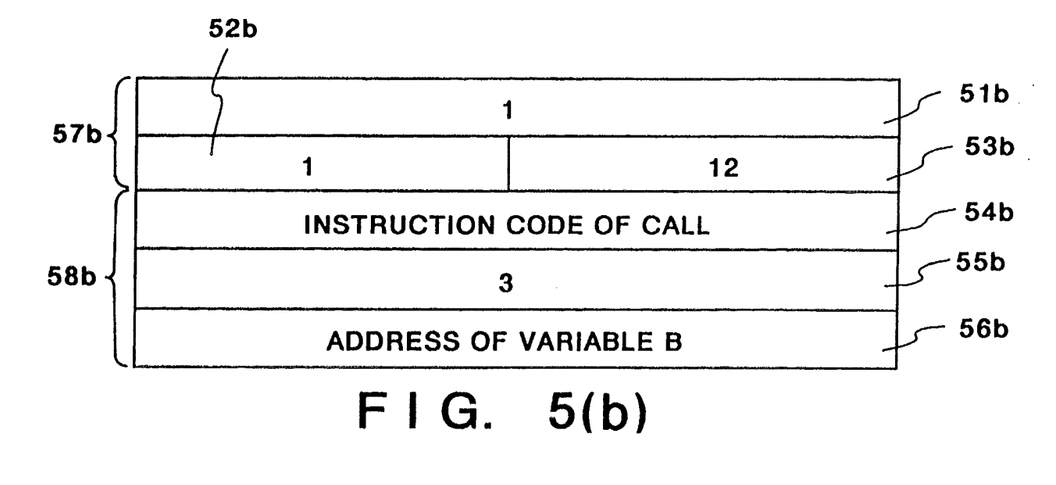

Next, in order to know the execution status of task "2", "task execution status data" of the memory 21 is checked. In this case, it is known that the execution main body section 58b is not yet processed in the "22nd" step of task "2". Therefore, step S306 of FIG. 3(a) branches to the side of NO. In step S307, the value of the internal register R0 is decremented and the operation returns to step S303. Since the value of the internal register R0 is formerly "1", the current value of the internal register R0 is changed to "0". Therefore, step S303 branches to the side of YES and the operation moves to the processing of the instruction main body section 58a. A code indicating that the instruction main body section is being processed is written to its "task execution status data" so that task 2 that follows does not perform the processing of the instruction main body section 58b in step S22.

Next, a field 54a is retrieved from the memory 21 and its value is set in the internal register R0. The value of R0 is transferred to the instruction decoder 25 and interpreted. The number of operands required is obtained. A code of a call instruction for calling other tasks is stored in the field 54a of this example. The call instruction in this embodiment has a task number to be called and an address of a parameter, namely, a total of two operands. As a result, N=2.

Next, in step S312 of FIG. 3(b), the number of operands N is stored in the internal register R7. In this embodiment, N=2, so the loop from step S314 to step S316 is repeated two times. In the above-described loop, the value of a field 55a is set in an internal register R6 and the value of a field 56a is set in an internal register R5.

Next, the instruction decoder 25 interprets the instruction code 54a and transfers its result to the instruction execution section 24 in step S317. A task number to be called is set in the internal register R6 and an address of a parameter is set in the internal register R5. By using these two operands, a call instruction is executed in step S318.

At the completion of the execution of the call instruction, a code indicating that step S12 is not in execution is written to the storage area "task execution status data" of the memory 21, and one cycle of executing the execution condition decision section 57a and the instruction main body section 58a is terminated.

The procedures for executing step S22 of task 2 will now be explained. As explained above, at the time the execution condition decision section 57b of step S22 is executed, the instruction main body section 58a of step S12 has already been executed.

First, a code indicating that the execution condition decision section 57b of step 22 of task 2 is in process is written to the "task execution status data". In step S301, the number of execution decision data of a field 51b is retrieved and its value is set in the internal register R0.

Since the value of the internal register R0 set now is "1" the operation branches to the side of NO in step S303 and the next one word (execution condition decision data 52b and 53b) is retrieved from the memory 21. Then, the value of the upper-order one byte (task number 52b) of "1" is set in the internal register R1 and the value of the lower-order one byte (step number 53b) of "12" is set in the internal register R2. Then, to know the execution status of task "1", "execution decision data" in the memory 21 is checked. In this case, it is known that the instruction main body section 58a of the "12th" step of task "1" is being processed. As a result of this, step S306 branches to the side of YES and the control returns to step S301.

In this embodiment, while the instruction main body section 58a of step S12 of task 1 is being processed, the loop from step S301 to step S306 is repeated for task 2. Therefore, the processing of the instruction main body section 58b of step S22 of task 2 is held and exclusive processing can be realized.

In the first embodiment, interpretation of a various kinds of instruction codes is performed by the instruction decoder of a computer. However, for example, an operating system or an interpreter may also interpret instruction codes.

The instruction decoder may be comprised of hardware or microprograms.

In the first embodiment, the first field of instruction format is used for the number of execution decision data. This is for simplifying processing of the instruction decoder. If the instruction decoder performs the processing of counting the number of execution decision data prior to the processing of the instruction decoder, inclusion of the number of execution decision data n is not required.

As set forth hereinabove, according to the first embodiment, the user does not need to write execution conditions as programs and a small quantity of data necessary for deciding execution conditions should be added in an instruction. As a result of this, program size can be made small.

A small program lightens the burden of the user and decreases the incidence of bugs.

[SECOND EMBODIMENT]

The second embodiment relates to an information processing device suited to operate in a multi-CPU system and the manufacturing method of the same.

Figure 6:
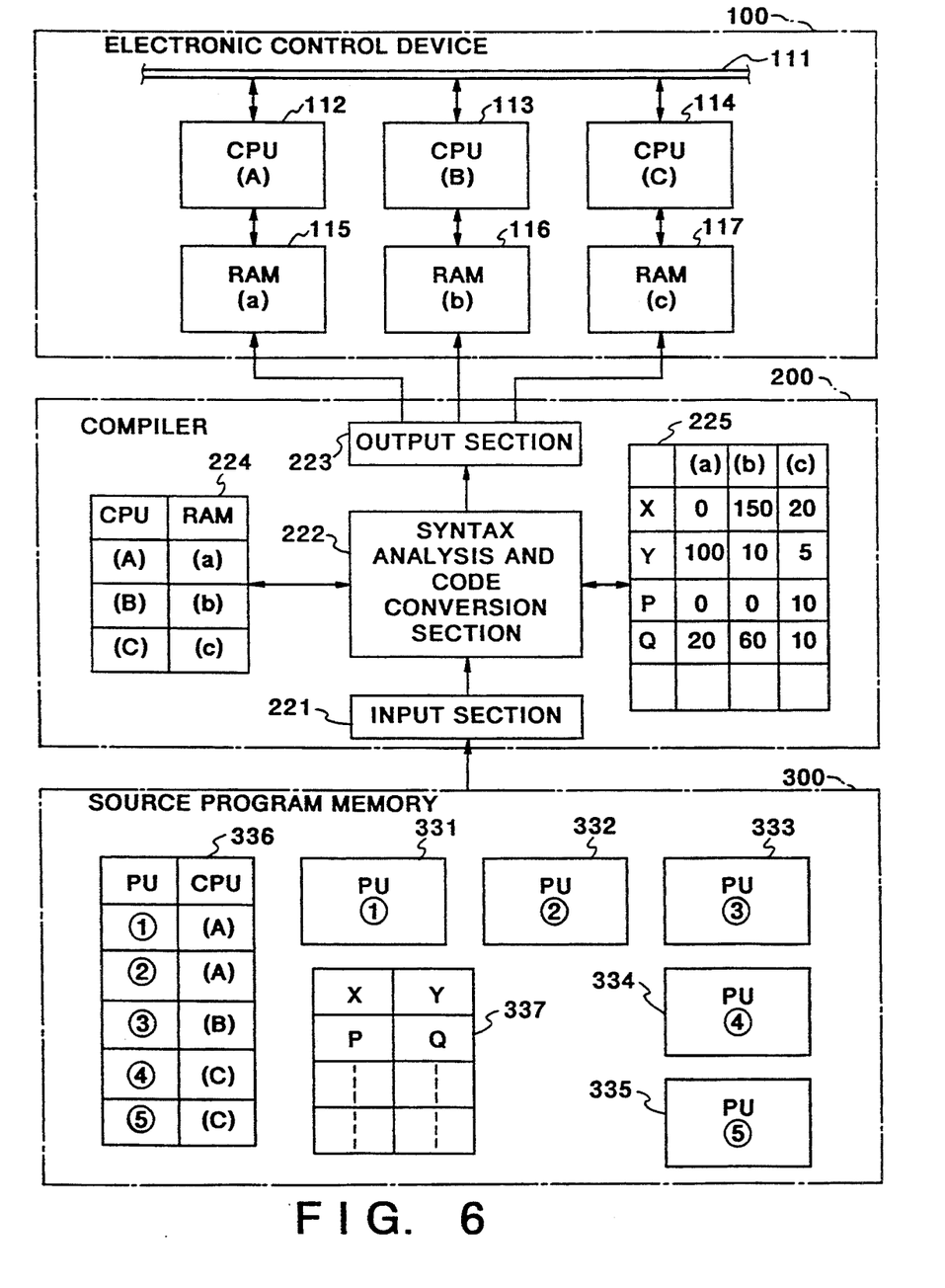
FIG. 6 is a view for explaining an electronic control device utilizing the information processing device of the second embodiment and the manufacturing method of the same.

FIG. 6 is a block diagram of the configuration of an electronic control device utilizing an information processing device of the second embodiment and the manufacturing method of the same. In the figure, reference numeral 100 designates an electronic control device utilizing an information processing device of the second embodiment. It controls targets under a multi-CPU system. Reference numeral 200 denotes a compiler. It compiles en block those processes which the multi-CPUs of the electronic control device 100 perform. Numeral 300 denotes a source program memory. It stores source programs that govern those processes which multi-CPUs of the electronic control device 100 perform.

In the electronic control devices 100, 112 to 114 denote one-chip CPUs (A) to (C) respectively, which share various controls of the electronic control device 100. Numerals 115 to 117 denote RAMs (a) to (c), each being connected to corresponding CPUs (A) to (C) and storing a control program which a corresponding CPU executes. RAMs (a) to (c) may be ROMs. Numeral 111 denotes a communication line disposed between CPUs (A) to (C), being formed, for example, by LAN (Eathernet, etc.). Those CPUs (A) to (C) communicate with each other via the communication line 111. The CPUs (A) to (C) have their own CPU bus (not shown) and control their own control targets separately via the CPU bus.

It is necessary for those CPUs (A) to (C) to reference and update their own variables (local variables) to control separately. Such local variables are stored in RAMs (a) to (c) corresponding to those CPUs (A) to (C) respectively, and each of the CPUs (A) to (C) can directly access their own local variables from corresponding RAMs (a) to (c). On the other hand, there exist variables which are referenced by a plurality of CPUs (global variables) in a multi-CPU system. Such global variables are stored in any one of the RAMs (a) to (c) depending on the frequency of references by the CPUs (A) to (C). When the CPUs (A) to (C) can access such global variables directly, they access directly from corresponding RAMs (a) to (c). When they cannot access directly, the system requests a CPU that can directly access a global variable to access via a communication line 111. In this way, multi-CPU control for the entire electronic control device is performed efficiently.

In a source program memory 300, reference numerals 331 to 335 denote process units (PU) ① to ⑤ Respective source programs ① to ⑤ are written with various control targets or control purposes as units. Numeral 336 denotes a PU/CPU arrangement table which describes which of the CPUs (A) to (C) is in charge of the execution of PUs ① to ⑤. For example, CPU (A) is in charge of PUs ① and ②. CPU (B) is in charge of PU ③. CPU (C) is in charge of PUs ④ and ⑤. Such PU/CPU arrangement table 336 is prepared by a programmer. Numeral 337 denotes a global variable table in which a plurality of global variables (global variable names X, Y, P, Q, ---, variable types, etc.) are defined.

In a compiler 200, numeral 221 denotes an input section where source programs are input from a source program memory 300. Numeral 222 denotes a syntax analysis code conversion section where syntaxes of input source programs are analyzed and corresponding object codes are generated. At that time, various operands are referenced and local variables and global variables X, Y, P, Q, etc. are included in the operands. Numeral 224 denotes a CPU/file table where what files {RAMs (a) to (c)} are respectively connected to the CPUs (A) to (C) are described. As a result of this, an object program to be executed by CPU (A) is assigned to RAM (a). An object program to be executed by CPU (B) is assigned to RAM (b). An object program to be executed by CPU (C) is assigned to RAM (c). Numeral 223 denotes an output section where object programs corresponding to each of the RAMs (a) to (c) assigned in the CPU/file table 224 are written. Numeral 225 denotes a global variable reference counter where the number of references to global variables by the CPUs (A) to (C) is counted respectively, that is, according to the RAMs (a) to (c) respectively which those CPUs (A) to (C) originally want to reference directly, at each time operands such as global variables X, Y, P, Q, etc are referenced by the syntax analysis code conversion section 222. For example, in the case of the global variable X, when the multi-CPUs (A) to (C) actually execute object programs, it follows that accesses by CPU (A) are 0, those by CPU (B) are 150 and those by CPU (C) are 20.

Figure 7:
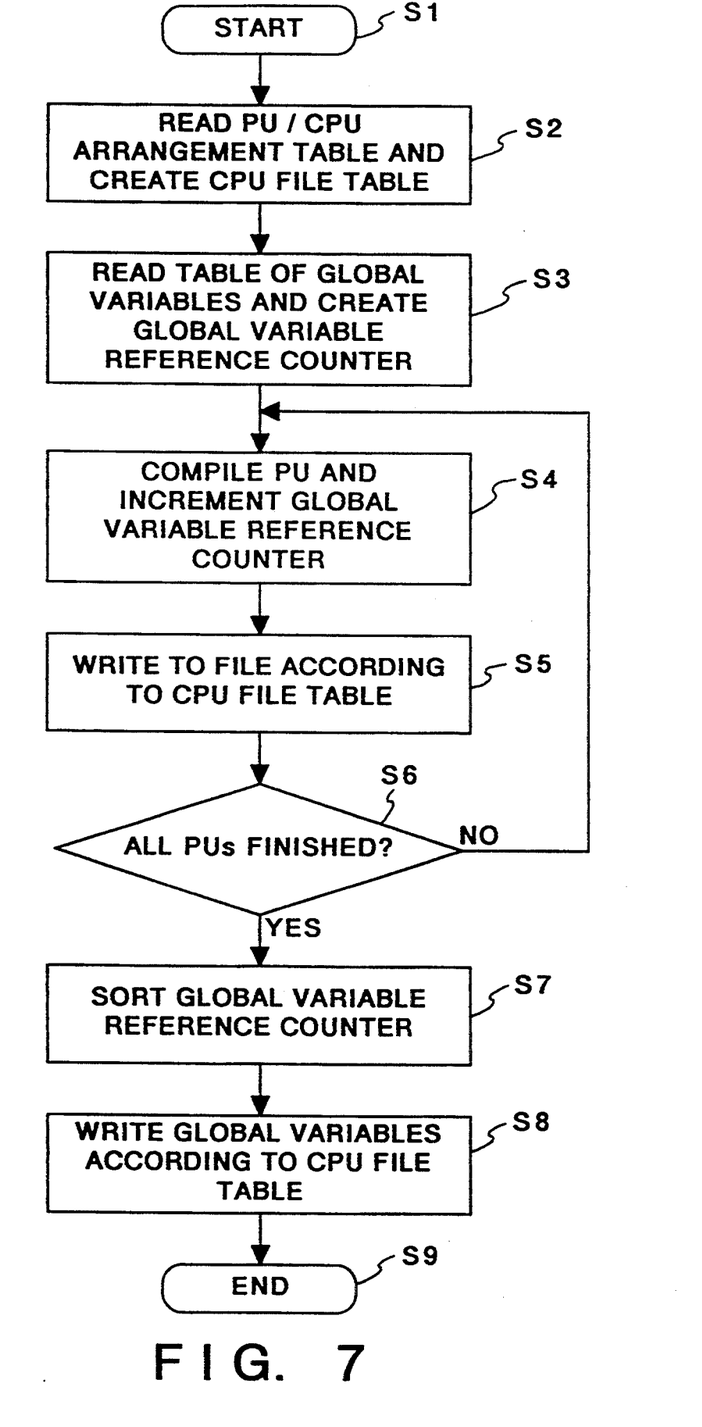
FIG. 7 is a flowchart for compile processing of the second embodiment.

FIG. 7 is a flowchart for compile processing of the second embodiment. In this figure, a compiler 200 is started in step S1. The input section 221 of the compiler 200 selects the source program file 300 and starts inputting source program information as occasion demands. In step S2, the PU/CPU arrangement table 336 is sought from the source program file 300 and the CPU file table 224 is created inside the compiler 200 according to the table information. In step S3, each entry for a global variable reference counter 225 is created on the basis of the information of the created CPU file table 224 and the global variable table 337 of the source program file 300. In step S4, PU ① of the source program file 300 is read in, syntax analysis is performed in turn, and object codes are created. At that time, when a global variable has been referenced, a destination at which PU ① currently creating codes is to be loaded is sought by using the CPU file table 224 and the reference counter of CPU (A) {=RAM (a)} for global variables is incremented by 1. In step S5, created object codes are output to RAM (a) which is indicated by the CPU file table 224. In step S6, it is checked whether or not all PUs ① to ⑤ in the source program file 300 has been compiled. If the compiling is not terminated, the operation returns to step S4. If terminated, the operation proceeds to step S7 where RAMs (a) to (c), which are mostly referenced for each of those global variables X, Y, P, Q, etc. of the global variable reference counter 225 are detected. In step S8, each of the global variables X, Y, P, Q, etc. is allocated to RAMs (a) to (c) which are mostly referenced. Though not shown, finally, PU ① and PU ②, for example, are linked by a linkage editor and the entire multi-CPU system is created and allocated.

In the above-described embodiment, a single electronic control device has been described. However, the electronic control device is not limited to this embodiment. For example, the CPUs (A) to (C) may be provided on devices which are separate in appearance. The plurality of devices separate in appearance are connected by a local area network (LAN), control specific targets and carry out specific objects as a whole.

When references of global variables appears in a description of a loop, the number of loops may be multiplied to the count.

When the number of such loops is not defined at the time of compiling, a count of references may be estimated close to a count of references at execution time to determine a reference frequency by multiplying a certain coefficient or so.

As set forth hereinabove, according to the second embodiment, each of those global variables can be accessed by the CPU which access it more frequently than other CPU's, directly from their own memories, thereby improving the control efficiency of the entire multi-CPU system.

Also, according to the second embodiment, an information processing device having high control efficiency of the entire multi-CPU system can be manufactured by a simple compiling process.

As many apparently widely different embodiments of the present invention can be made without departing from the spirit and scope thereof, it is to be understood that this invention is not limited to the specific embodiments thereof except as defined in the appended claims.

What is claimed is:

1. An apparatus which concurrently executes a plurality of tasks, said apparatus comprising:

storage means for storing instructions corresponding to steps of a task in a plurality of tasks and all identifiers which specify steps in other tasks which should be exclusively executed with respect to each step corresponding to the instructions stored in said storage means;

judgment means for judging, before a particular instruction stored in said storage means corresponding to a pertinent step is executed, whether any of the steps specified by the identifiers are being executed, if identifiers are stored in said storage means with respect to the pertinent step; and execution means for executing the particular instruction stored in said storage means corresponding to the pertinent step when said judgment means judges that none of the steps specified by the identifiers are being executed.

2. The apparatus according to claim 1, further comprising:

second storage means capable of being referred to by each task; and storage controlling means for storing status information, at a start of execution of each of the steps in the plurality of tasks, in said second storage means indicating that the step is being executed, and eliminating the status information stored in said second storage means at completion of the execution of the step.

3. The apparatus according to claim 2, wherein said judgment means judges whether any of the steps specified by the identifiers are being executed by reference to said second storage means.

4. The apparatus according to claim 1, wherein said storage means further stores information indicating a number of identifiers as well as identifiers specifying steps and tasks, said judgment means reads out the information indicating the number of identifiers, decrements the information indicating the number of the identifiers every time it is determined that the step specified by the identifier is not being executed, and judges that none of the steps indicated by the stored identifiers are being executed when a result of decrementing the information indicating the number of identifiers equals zero.

5. A method which concurrently executes a plurality of tasks, said method comprising computer implemented steps of:

reading out, before executing a particular instruction corresponding to a pertinent step of a task in a plurality of tasks, all identifiers which specify steps in other tasks which should be exclusively executed with the pertinent step from a memory which stores instructions corresponding to steps of the task and all identifiers with respect to each step corresponding to the instructions;

judging, before executing the particular instruction, whether any steps specified by the identifiers are being executed, if identifiers are read out from the memory with respect to the pertinent step in said step of reading; and executing the stored particular instruction corresponding to the pertinent step after the step of judging, when said judging step judges that none of the steps specified by the identifiers are being executed.

6. The method according to claim 5, further comprising the steps of:

storing, at a start of execution of the pertinent step, status information indicating that the pertinent step is being executed in a second memory capable of being referred to by each task; and eliminating the status information after a completion of execution of the pertinent step.

7. The method according to claim 6, wherein said step of judging is performed by judging whether any of the steps specified by the identifiers are being executed by reference to the second memory.

8. The method according to claim 5, wherein the memory stores a number of identifiers in the memory as well as the identifiers specifying steps and tasks, wherein said step of judging comprises the steps of:

reading out the number of identifiers from the memory;

decrementing the number of the identifiers stored in the memory every time it is determined that the step specified by the identifier read out in the step of reading is not being executed; and judging that none of the steps specified by the stored identifiers are being executed when a result of said step of decrementing the number of identifiers equals zero.

* * * * *